Jan. 8, 1963
G. K. EATON
3,072,796
PHOTO-ELECTRIC CELL
Filed March 22, 1960
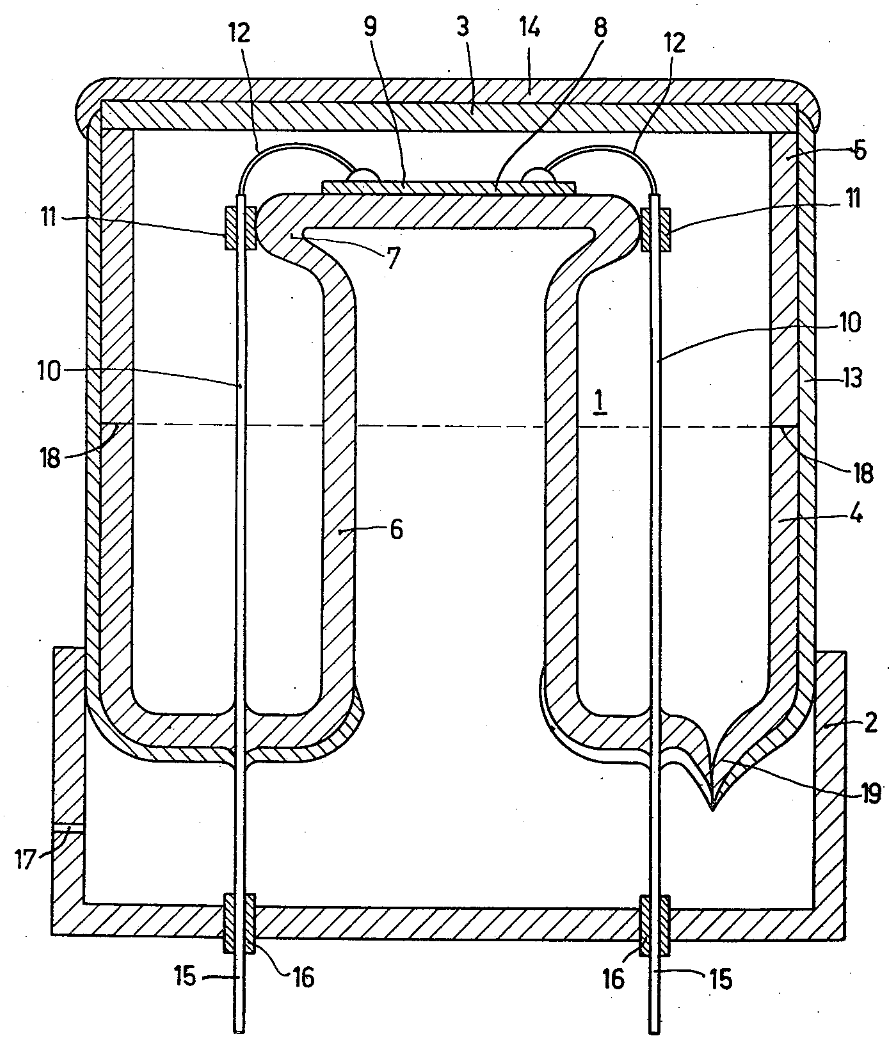
INVENTOR
G. K. EATON
BY
Frank R. Trifari
AGENT United States Patent Office 3,072,796

Patented Jan. 8, 1963

3,072,796
PHOTO-ELECTRIC CELL

Geoffrey Kingston Eaton, Shirley, Southampton, England, assignor to North American Philips Company, Inc., New York, N.Y., a corporation of Delaware Filed Mar. 22, 1960, Ser. No. 16,837
Claims priority, application Great Britain Mar. 26, 1959
3 Claims. (Cl. 250—211)

The present invention relates to photo-electric cells.

It has been found that high sensitivity photo-electric cells, for example, cells having a photo-electric element for use at liquid air temperature, are affected by ambient illumination prior to use. Thus if a cell is left in daylight or exposed to artificial illumination before use, it has a lower sensitivity than if it is kept in the dark prior to use. In general, such illumination at low temperatures has a much greater effect than if a cell is at room temperature. This phenomenon is referred to herein as the fatigue effect.

It is now believed, although the present invention is not limited by this belief, that the fatigue effect is a surface phenomenon and that illumination prior to use decreases the resistance of a surface layer which then acts as a shunt. Restoration of the sensitivity of a cell which has been illuminated can be accelerated by heating the cell in the dark, for example, to about 100° C.

Further investigation has now shown that the radiation responsible for the fatigue effect is of relatively short wavelength and that above a critical fatigue wavelength, which is characteristic for each semi-conductor material, no significant fatigue effect occurs.

Hereinafter in this specification the terms transparent, wavelength-selective and opaque where used have the following meanings:

Transparent means passing infra-red and visible radiation both above and below the critical fatigue wavelength;

Opaque means passing neither visible nor infra-red radiation; and

Wavelength-selective means preventing passage of radiation of less than the critical fatigue wavelength and allowing passage of radiation to which the cell is sensitive and which may be infra-red radiation in the wavelength range above the critical fatigue wavelength.

According to a first aspect of the present invention a photoelectric cell comprises a photo-sensitive element exhibiting the fatigue effect and an envelope within which the element is secured, which prevents passage of radiation of wavelength less than the critical fatigue wavelength and which permits passage of radiation of wavelength greater than the critical fatigue wavelength and to which the element is sensitive.

A second aspect of the present invention consists in the combination of a photo-electric cell comprising a photo-sensitive element exhibiting the fatigue effect and an envelope and an enclosure within which the cell is secured, which prevents passage of radiation of wavelength less than the critical fatigue wavelength and which permits passage of radiation of wavelength greater than the critical fatigue wavelength and to which the element is sensitive.

A third aspect of the present invention consists in the combination of a photo-electric cell comprising a photo-sensitive element exhibiting the fatigue effect and an envelope and a part enclosure, the envelope and the part enclosure being such, and being so arranged, that passage of radiation of wavelength less than the critical fatigue wavelength to the element is prevented and passage of radiation of wavelength greater than the critical fatigue wavelength and to which the element is sensitive is permitted.

The photo-electric cell may, for example, be a photo-conductive cell, a photo-electro-magnetic cell, a photo-diode or a photo-transistor.

The entire envelope may be wavelength-selective or as an alternative a part of the envelope may be wavelength-selective, constituting a window, and the rest of the envelope opaque.

The wavelength-selective envelope or window may be of wavelength-selective material or may be of transparent material carrying a layer, acting as a filter, of wavelength-selective material. The layer may be a solid body secured to the transparent material or may be deposited on the transparent material. If the envelope has an opaque part, the opaque part may be of opaque material or may be of transparent or wavelength-selective material provided with an opaque layer, for example, of black paint or lacquer.

Windows which may be used for the envelope or the enclosure in particular cases are glass, which may be bloomed for a particular wavelength with vacuum-deposited zinc oxide on which is deposited a filter layer of lead sulphide, silicon, either itself constituting the window or as a solid body secured to glass. Silicon may be bloomed with vacuum deposited silicon monoxide. As a further alternative the window may be of glass on which silicon is deposited. Instead of glass, which is transparent to a wavelength of 5$\mu$, sapphire, which is transparent to a wavelentgh of 6$\mu$, may be used, for example, in indium antimonide photo-cells.

It has been determined that the critical wavelength for InSb is about 0.7$\mu$ and that for PbSe is about 0.4$\mu$. In general, the PbSe cell may be used and shows the fatigue effect at room temperature whereas the InSb cell is usually used below room temperature and shows the fatigue effect to a marked degree at about −180° C.

Examples of cells and combinations according to the present invention will now be described with reference to the accompanying diagrammatic drawing, given by way of example, showing in axial section a combination according to the present invention.

Referring now to the FIGURE, the apparatus comprises a generally cylindrical photo-electric cell 1 and a cylindrical cap 2.

The cell 1 comprises a window member 3 of sapphire sealed to a glass body 4 by way of a graded seal portion 5. The body 5 has a reentrant portion 6 the top 7 of which is mushroom shaped. The inner surface 8 of the top of the reentrant portion opposite the member 3 is ground flat and a single crystal filament 9 of indium antimonide of dimensions 12 mm. x 0.5 mm. x 0.01 mm. is affixed to the surface 8, which has a radius of 14 mm., with the aid of a silicone adhesive. The thickness of the top of the re-entrant portion after grinding is 0.8 mm.

Conductors 10 of platinum of 0.5 mm. diameter are sealed through the body 4 and within the cell secured to the top 7 of the re-entrant portion 6. The conductors 10 are provided with a glass sheath portion 11 which is secured to the top 7 by application of flame heat. Connection from the conductors 10 to the filament 9 is provided by platinum wires 12 two thousandths of an inch thick spot welded to the conductors and soldered to the filament 9 with the aid of tin-lead (60:40) solder so that about 8 mm. of the 12 mm. length of the filament is provided between the soldered connections.

An opaque layer 13 of black cellulose paint is provided on the outer surface of the body 4 extending from the member 3 to the portion 6 and a layer 14 of lead sulphide 5$\mu$ thick is provided by vacuum evaporation deposition on the outer surface of the member 3 to provide a wavelength-selective window.

The inner and outer surfaces of the layer 14 are bloomed by vacuum-evaporated zinc-oxide.

The opaque part of the combination is completed by the metal cap 2 which is a push fit over the outer surface of the body 4 which has apertures 15 for the conductors 10. Insulating bushings 16 are provided between the cap 2 and the conductors 10. The cap 2 also has a small third aperture 17 for escape of refrigerant which has been heated and become gaseous.

As a first modification, if it is not desired to use refrigerant, the layer 13 may be provided over the entire outer surface of the body 4.

As a second modification, the layer 14 may be replaced by a disc of silicon 0.5 mm. thick secured to the member 3 with the aid of a cold-setting epoxy resin adhesive applied between the disc and the member 3 near their outer edges. Both surfaces of the disc are bloomed by vacuum-evaporated zinc oxide deposited thereon.

As a third modification the window may be constituted by a disc of silicon 1.0 mm. thick sealed directly to the body 4 around its circumference, the disc being thicker than that used in the second modification for mechanical reasons.

If a photo-electric cell is mounted within an enclosure, no special steps need be taken in the manufacture of the cell and it is comparatively simple to construct the enclosure, for example, with an opaque metal body and a wavelength-selective window secured thereto.

A simple way in which the cell may be manufactured involves the separation of the body 4 into two portions along the line 18. Sealing-on of the window, blooming processes, grinding, securing and sealing in a conductors and securing and connection of the filament 9 may readily be carried out before the two portions are secured together. The cell is thereafter pumped, the sealed off exhaust stem being shown at 19, painted and provided with the layer 14.

What is claimed is:

1. A high-sensitivity photocell comprising photoconductive indium antimonide sensitive to radiation over a given wavelength range and exhibiting a fatigue effect wherein its sensitivity is greatly reduced upon exposure to radiation of a wavelength shorter than about 0.7 micron, and means enclosing said photoconductive member and opaque to wavelengths shorter than about 0.7 micron but including a portion transparent to wavelengths greater than about 0.7 micron and within the said given range and allowing incident radiation of the latter character to impinge upon the indium antimonide, whereby the indium antimonide is prevented from exhibiting the fatigue effect and retains high sensitivity.

2. A photocell as set forth in claim 1 wherein the transparent portion is selected from the group consisting of lead sulphide, silicon and sapphire.

3. A high-sensitivity photocell comprising photoconductive lead selenide sensitive to radiation over a given wavelength range and exhibiting a fatigue effect wherein its sensitivity is greatly reduced upon exposure to radiation of a wavelength shorter than about 0.4 micron, and means enclosing said photoconductive member and opaque to wavelengths shorter than about 0.4 micron but including a portion transparent to wavelengths greater than about 0.4 micron and within the said given range and allowing incident radiation of the latter character to impinge upon the lead selenide, whereby the lead selenide is prevented from exhibiting the fatigue effect and retains high sensitivity.

References Cited in the file of this patent

UNITED STATES PATENTS

| | | |
|---|---|---|
| 2,406,139 | Fink et al. | Aug. 20, 1946 |
| 2,742,550 | Jenness | Apr. 17, 1956 |
| 2,953,529 | Schultz | Sept. 20, 1960 |

OTHER REFERENCES

Pakswer: Journal of Applied Physics, vol. 18, 1947, pp. 203–206.